US005418527A

United States Patent [19]
Yashiro

[11] Patent Number: 5,418,527
[45] Date of Patent: May 23, 1995

[54] REMOTE CONTROL SYSTEM FOR AUDIO/VIDEO SYSTEM

[75] Inventor: Kenji Yashiro, Tokyo, Japan

[73] Assignee: Pioneer Electronic Corporation, Tokyo, Japan

[21] Appl. No.: 181,879

[22] Filed: Jan. 13, 1994

Related U.S. Application Data

[63] Continuation of Ser. No. 806,383, Dec. 13, 1991, abandoned.

[30] Foreign Application Priority Data

Mar. 19, 1991 [JP] Japan ................... 3-080916

[51] Int. Cl.$^6$ ................................. H04Q 1/39
[52] U.S. Cl. .................. 340/825.24; 340/825.72; 348/734; 364/146
[58] Field of Search .............. 340/825.22, 825.24, 340/825.69, 825.72; 348/734, 374; 364/400, 141, 144, 146, 188, 191

[56]         References Cited
U.S. PATENT DOCUMENTS 4,241,400 12/1980 Kiefer ................... 364/146
4,646,224 2/1987 Ransburg et al. ................. 364/146
4,771,283 9/1988 Imoto ................... 340/825.71
4,825,209 4/1989 Sasaki et al. ................... 340/825.72
4,965,557 10/1990 Schepers et al. ................... 348/734
4,982,319 1/1991 Nau et al. ................... 364/146
5,028,919 7/1991 Hidaka ................... 340/825.72
5,081,534 1/1992 Geiger et al. ................... 358/194.1
5,255,180 10/1993 Shinoda et al. ................. 340/825.24

FOREIGN PATENT DOCUMENTS 3003425 8/1981 Germany .
3244712 6/1984 Germany .

Primary Examiner—Donald J. Yusko
Assistant Examiner—Edward Merz
Attorney, Agent, or Firm—Nikaido, Marmelstein, Murray & Oram

[57]          ABSTRACT

A remote control system for an audio/video system has a first remote controller for transmitting a first remote control signal for designating and operating one of the A/V devices. In accordance with the first remote control signal, an operational mode for a designated A/V device is set. A second remote control signal transmitter is provided for transmitting a second remote control signal for operating the designated A/V device in accordance with the set operational mode.

5 Claims, 6 Drawing Sheets

_5,418,527_

REMOTE CONTROL SYSTEM FOR AUDIO/VIDEO SYSTEM

This application is a continuation of application Ser. No. 07/806,383, filed Dec. 13, 1991, now abandoned.

FIELD OF THE INVENTION

The present invention relates to a remote control system for an audio/video system comprised of various audio and video devices.

BACKGROUND OF THE INVENTION

Various audio devices and video devices such as video tape recorder, video disk player, community antenna television, have come to be widely used in the home. These devices are functionally connected into an audio/video (A/V) system so that, high-quality images and high-quality sounds are realized in any of the devices. Since the A/V system is not professionally used, it is preferable that the A/V system may be easily controlled by average users.

FIG. 5 is an example of an A/V system having a variety of audio/video (A/V) devices 40 such as TV tuner 1, satellite broadcast (BS) tuner 2, video disc (VD) player 3, video tape recorder (VTR) 4, compact disk (CD) player 5, FM/AM tuner 6 and a cassette deck 7. All of these devices 40 are connected to a television 8 and/or speakers 9 through an audio/video (A/V) amplifier 7A. A remote controller 10 is provided to control each of these devices 40, 7A, 8 and 9.

For example, in order to play a video tape loaded on the VTR 4, the following operations are necessary.

(1) A TV video mode button of the remote controller 10 is depressed to set the TV 8 in a video input mode.

(2) An A/V amplifier video input mode button of the remote controller 10 is depressed to set the A/V amplifier 7A in a video input mode.

(3) A playback button of the remote controller 10 is depressed to start the VTR 4.

The operations are troublesome to a person not thoroughly acquainted with the handling of the remote controller 10.

In order to simplify the operation, there has been provided a programmable remote controller 10A as shown in FIG. 6. The programmable remote controller 10A has a memory where transmission codes of individual remote controllers 10a to 10h for the respective A/V devices 40 are stored. The remote controller 10A is programmed to automatically execute necessary operations for operating an A/V device 40. Namely, only a VTR playback button of the programmable remote controller 10A is pushed to play the video tape in the VTR 4. The reason the programmable remote has come to be extensively used in a very short time is that the A/V devices are now provided with a microcomputer so as to be electronically controlled. The microcomputer can easily decode signals from the remote controller.

However, operation codes from the remote controller, each of which corresponds to one operation, is transmitted to the A/V device 40 one by one. Hence a user must keep on depressing the button while all of the operation codes are transmitted from the programmable remote controller 10A to the A/V device 40. Accordingly, there is a lag between the time when the remote controller 10A is operated and the time when the A/V device 40 starts to operate, which means impairing of the operability.

SUMMARY OF THE INVENTION

An object of the present invention is to provide a remote control system having a good operability.

To this end, there is provided a remote control system for controlling various A/V devices, comprising a first remote signal transmitting device which generates a first remote control signal for designating and operating at least one of the A/V devices, an operational mode setting device for setting the operational mode of a designated A/V device in response to the first remote signal, and a second remote signal transmitting device for transmitting a second remote control signal for operating the designated A/V device in accordance with the set operational mode.

In accordance with the remote system of the present invention, when the first remote signal transmitting device is operated, the first remote control signal designating the operational mode of the A/V devices is applied to the second remote control signal transmitting device. The second remote control signal transmitting device applies a second remote control signal designating the operational modes to the designated A/V devices.

The other objects and features of this invention will become understood from the following description with reference to the accompanying drawings.

DETAILED DESCRIPTION OF THE PREFERRED EMBODIMENTS

Figure 1:
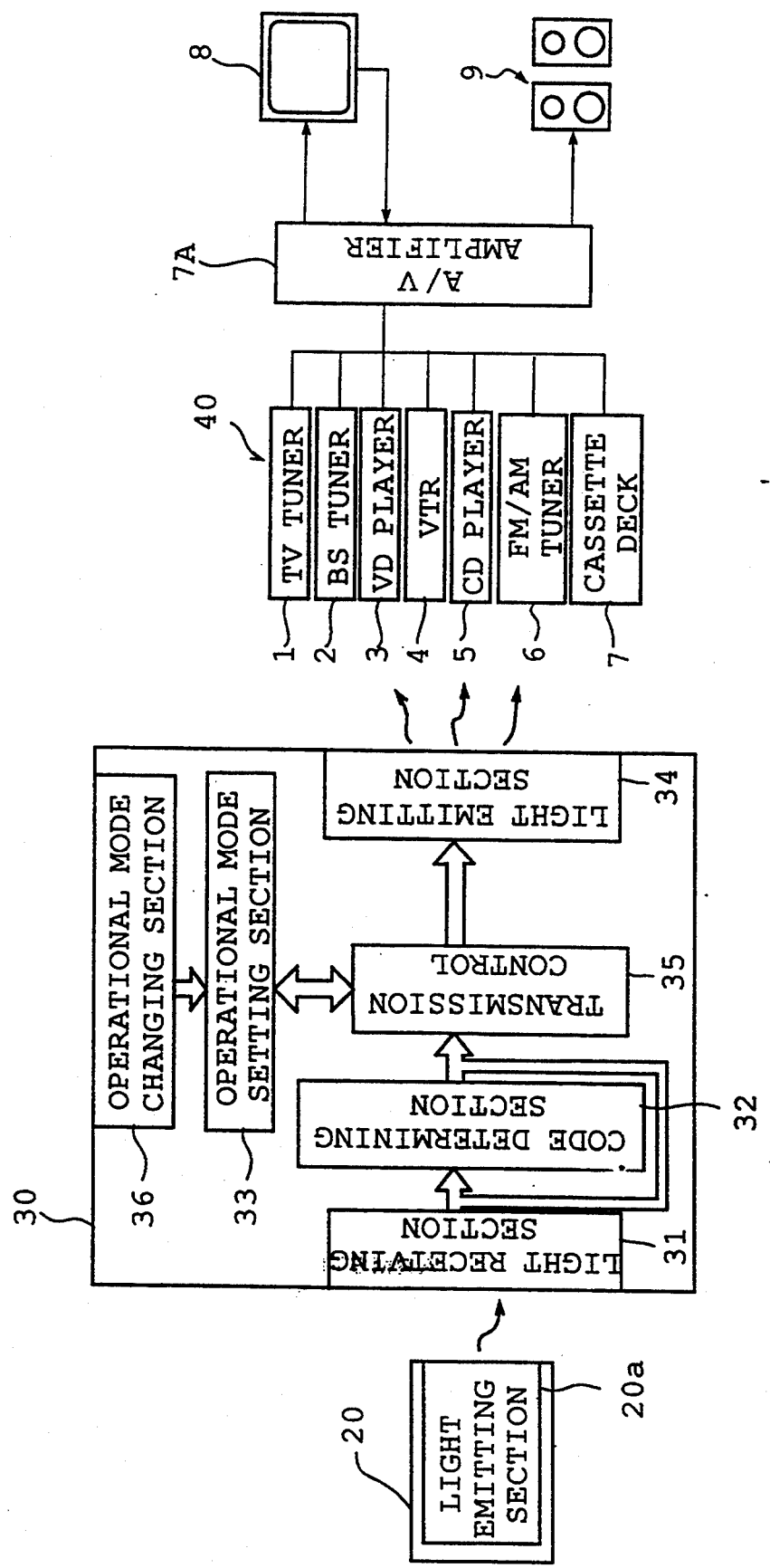
FIG. 1 is a block diagram showing a remote control system for an audio/video system according to the present invention.

Referring to FIG. 1, an A/V system to which the present invention is applied has the A/V devices 40 such as the TV tuner 1, BS tuner 2, VD player 3, VTR 4, CD player 5, FM/AM tuner 6 and the cassette deck 7 as hereinbefore described. The A/V devices 40 are connected to the television 8 and/or the speakers 9 through the A/V amplifier 7A. The devices 40 are remotely controlled by signals from an A/V system control unit 30 which receives a remote control signal by an infrared ray emitted from a light emitting section 20a of a remote control 20.

Figure 2:
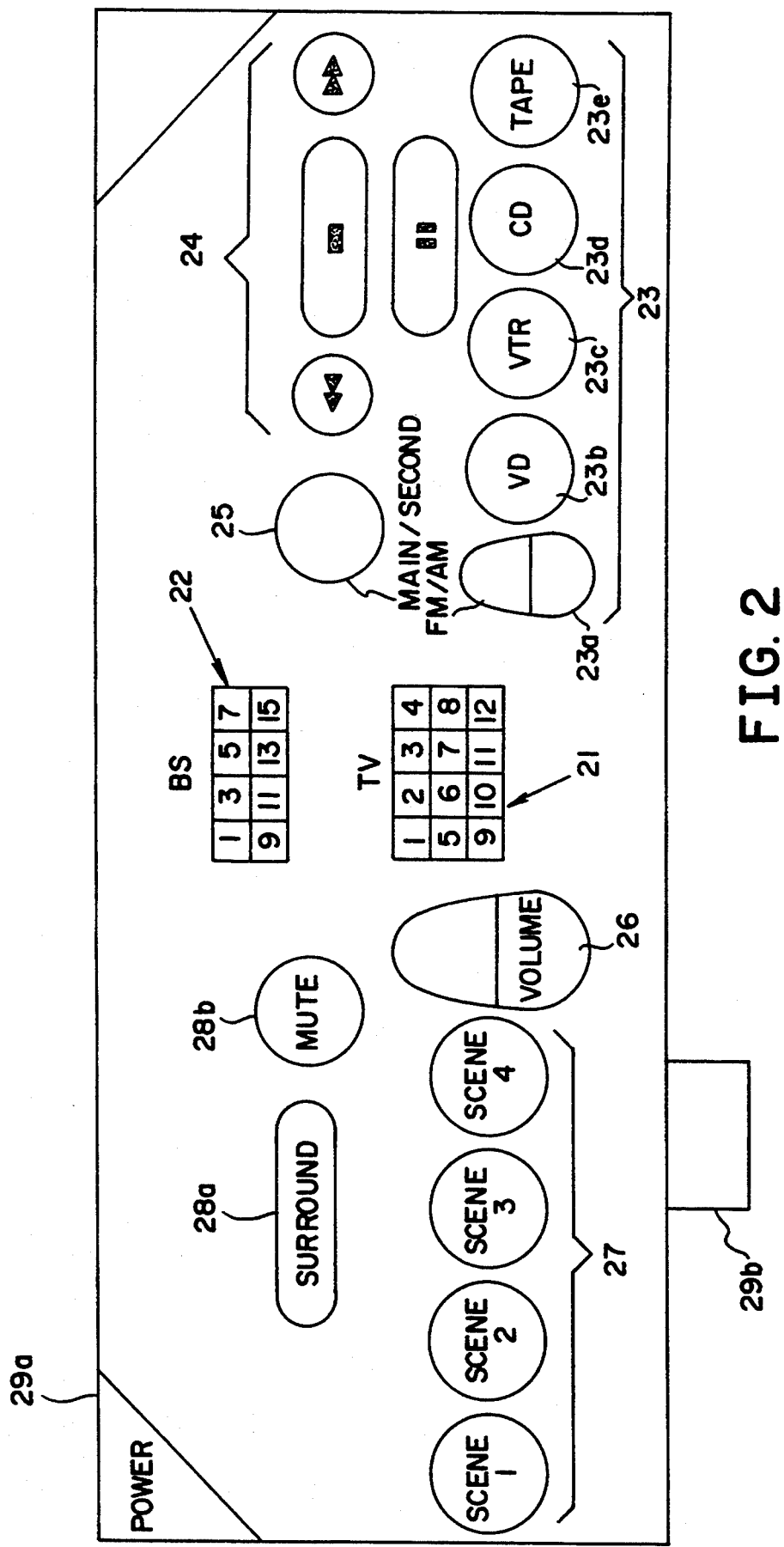
FIG. 2 is a schematic plan view of a remote control.

As shown in FIG. 2, the remote controller 20 has a matrix of TV channel keys 21 and a matrix of BS channel keys 22, which are, being most frequently used, positioned at the center of the remote controller 20. Disposed on the right of the TV channel keys 21 are a plurality of input source select buttons 23 for selecting one of the A/V devices 40 to be turned on. Namely, there are provided an FM/AM button 23a, VD player button 23b, VTR button 23c, CD player button 23d, and a cassette deck button 23e. Above the buttons 23, there are disposed transport buttons 24 such as a fast-forward button and rewind button for operating the video tape and cassette tape, and a selector button 25 for selecting second audio signals in a sound multiplex TV program.

Disposed on the left of the TV channel keys 21 are volume button 26 and scene select buttons 27. The scene select buttons 27 are not for controlling the A/V devices 40 but for controlling, for example, lighting of a room wherein the A/V system is installed. By operating the scene buttons 27, the atmosphere of the room can be changed.

Above the button 26 and 27, there are provided a surround button 28a and a mute button 28b. The mute button 28b is depressed, for example, when a telephone rings while an A/V device is played, so that the volume can be instantly attenuated to a predetermined level. Hence speaking on the telephone can be conducted without offending the caller.

A power button 29a is provided for turning the power of each A/V device 40 on and off. On the side of the remote controller 20, there is disposed a request button 29b for confirming the operation of the remote controller 20 in the dark. Namely, each keys and buttons, which is made of a translucent resin material, is provided with a lamp under it. When the request button 29b is depressed, all of the lamps under the buttons are lighted, for example, 5 seconds. Thus, the keys and buttons glow, thereby indicating positions of buttons.

The light emitting section 20a (FIG. 1) is formed on an upper side of the remote controller 20 adjacent the BS channel keys 22.

Referring back to FIG. 1, the A/V system control unit 30 has a light receiving section 31 for receiving one of commands a1 to an by an infrared ray from the light emitting section 20a of the remote controller 20. A command ai is fed to a light emitting section 34 through a transmission control section 35 which controls the emission of the ray from the section 34. Although the command ai from the remote controller 20 is transmitted to the A/V device 40 from the light emitting section 34, the A/V devices 40 are not operated.

The command ai is further fed to a code determining section 32 where a designation code bi corresponding to the command ai is determined. The designation code bi includes a component code designating one of the A/V devices 40 to be operated and an operation command code designating an operation such as a playback operation.

The designation code bi is applied through the transmission control section 35 to an operational mode setting section 33 having a memory wherein a plurality of sequential operation signals x1 to xm are stored in accordance with the designation code b as shown in the table.

TABLE

| a1 | b1 | x1   | x3   | x4 |
|----|----|------|------|----|
| a2 | b2 | x2   | x3   | x4 |
| a3 | b3 | x3   | x3   | x4 |
| a4 | b4 | x2   | x5   | x7 |
| .  | .  | .    | .    | .  |
| .  | .  | .    | .    | .  |
| .  | .  | .    | .    | .  |
| an | bn | xm-2 | xm-1 | xm |

The command a1 to an transmitted from the remote controller 20 correspond to the codes b1 to bn, and codes b1 to bn correspond to operation signals x1 to xm. The operation signal x includes a component command and an operating command. The operation signal x designates such operation as described below.

(1) Setting the FM/AM tuner 6 in a station selecting mode wherein a station of a chosen frequency is selected in accordance with the operation of the FM/AM button 23a, and the A/V amplifier 7A in an FM/AM tuner input mode.

(2) Setting the VD player 3 in a play mode, the TV 8 in an input mode, and the A/V amplifier 7A in an VD player input mode in accordance with the operation of the VD button 23b.

(3) Setting the VTR 4 in a play mode, the TV 8 in the input mode and the A/V amplifier 7A in a TV input mode in accordance with the operation of the VTR button 23c.

(4) Setting the CD player in a play mode and the A/V amplifier 7A in a CD player input mode in accordance with the operation of the CD button 23d.

(5) Setting the cassette deck 7 in a play mode and the A/V amplifier 7A in a cassette deck input mode in accordance with the operation of the cassette button 23e.

(6) Setting the TV tuner 1 in a channel selecting mode where a channel is selected in accordance with the operation of the TV channel keys 21 and the A/V amplifier 7A in a TV tuner input mode.

(7) Setting the BS tuner 2 in a channel selecting mode where a channel is selected in accordance with the operation of the BS channel keys 22 and the A/V amplifier 7A in a BS tuner input mode.

These operational modes set in the operational mode setting section 33 can be changed through a set mode changing section 36. For example, when an IC card wherein a mode data is stored is inserted in the A/V system control unit 30, the mode changing section 36 reads out the mode data in the IC card to change the mode stored in the setting section 33. Alternatively, the set mode changing section 36 is connected to an I/O port of a personal computer so that by operating the computer, the mode data is changed.

Figure 3:
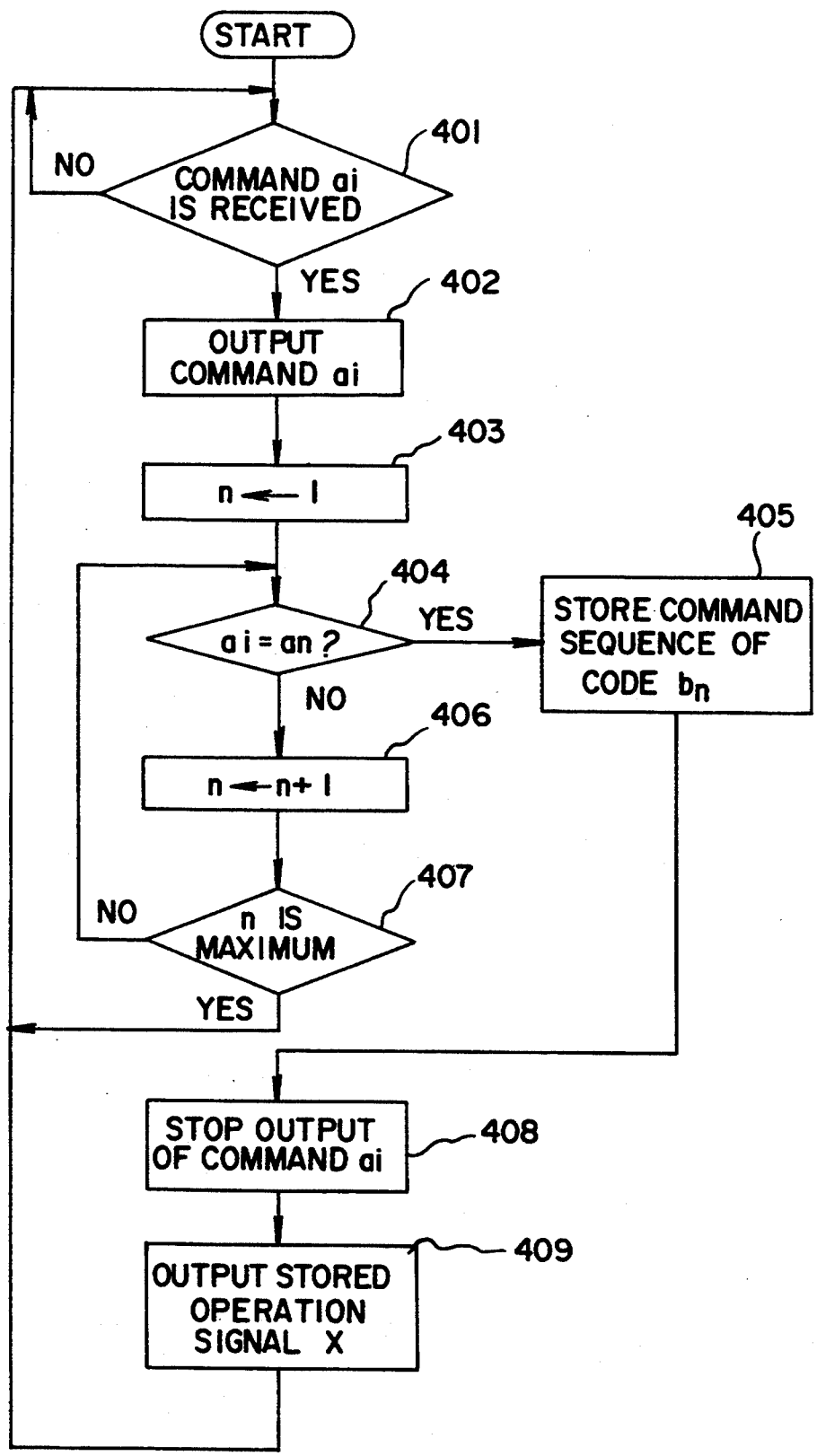
FIG. 3 is a flowchart describing the operation of the remote control system.

The operation of the A/V system control unit 30 is described hereinafter with reference to FIG. 3.

When it is determined that one of the commands ai of the remote control signal is received at a step 401, an infrared ray corresponding to the command ai is output from the light emitting section 34 at a step 402. At a step 403, the variable n is set to 1, and the command ai is compared with the command a1 in accordance with the table at a step 404. When the command ai coincides with the command a1, the sequential operation signal x1, x3 and x4 which corresponds to the code b1 is stored in the buffer (not shown) provided in the operational mode setting section 33, and the output of ai from the light emitting section is stopped.

When the command ai does not coincide with the command a1 at the step 404, the program goes to a step 406 where the variable n is increased by 1. When it is determined at a step 407 that the value of n is smaller than a maximum value in the table, the program returns to the step 404 to compare the command ai with the command a2. The steps 404, 406 and 407 are repeated until the reference an coincides with the command ai. When the variable n becomes the maximum value, the program returns to the step 401.

After the sequential operation signal x is stored at the step 405, the program proceeds to a step 408 where the transmission control section 35 stops the output of the command ai from the light emitting section 34. At a step 409, operation signal x stored in the buffer is output instead.

More particularly, when the FM/AM button 23a of the remote controller 20, for example, is depressed, the corresponding command ai is transmitted from the light emitting section 20a to the light receiving section 31 of the A/V system control unit 30, and is output from the light emitting section 34. However, the A/V devices stay inoperative. The command ai is fed to the code determining section 32 where the code bi corresponding to the command ai is determined. The code bi is applied to the operational mode setting section 33 where the operation signal xi corresponding to the code bi, namely, the commands for operations (1) described above are derived. The operation signal xi is transmitted from the light emitting section 34 in the form of an infrared ray to the FM/AM tuner 6 and the A/V amplifier 7A, and the output of ai is stopped. Thus, the FM/AM tuner 6 is turned on and the station is selected, so that the audio signal from the FM/AM tuner 6 is fed to the speaker 9 through the A/V amplifier 7A.

When the VD button 23b of the remote 20 is depressed, the operation signal x for the operation (2) is retrieved from the operational mode setting section 33. Thus, the A/V amplifier 7A is operated to connect the TV 8 and the VD player 3 so that a VD is played.

Thus, each A/V device 40 can be easily remotely operated just by depressing one of the select buttons 23, so that the operability and handling of the remote controller 20 is improved.

When an operation which is not included in the above described seven operations (1) to (7) such as recording a video tape is desired, a remote controller exclusively used for the VTR 4 is used. Namely, a recording button of the exclusive remote controller is depressed. Since the codes b1 to bn do not include a code for the recording operation, the system of the present invention does not correspond to the light from the exclusive remote controller, so that malfunction does not occur in the system. The television 8 is also operated by an exclusive remote controller for the television in order to perform the recording.

Figure 4:
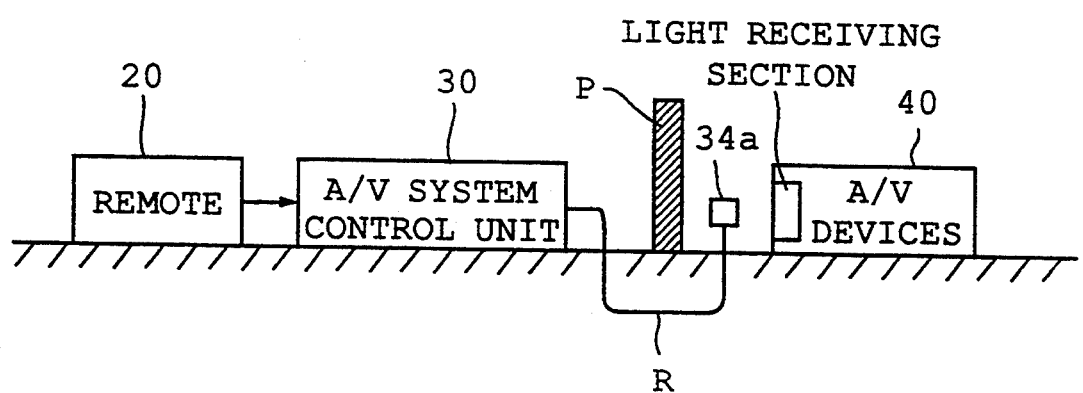
FIG. 4 is a schematic diagram of a remote control system of a second embodiment of the present invention.
Figure 5:
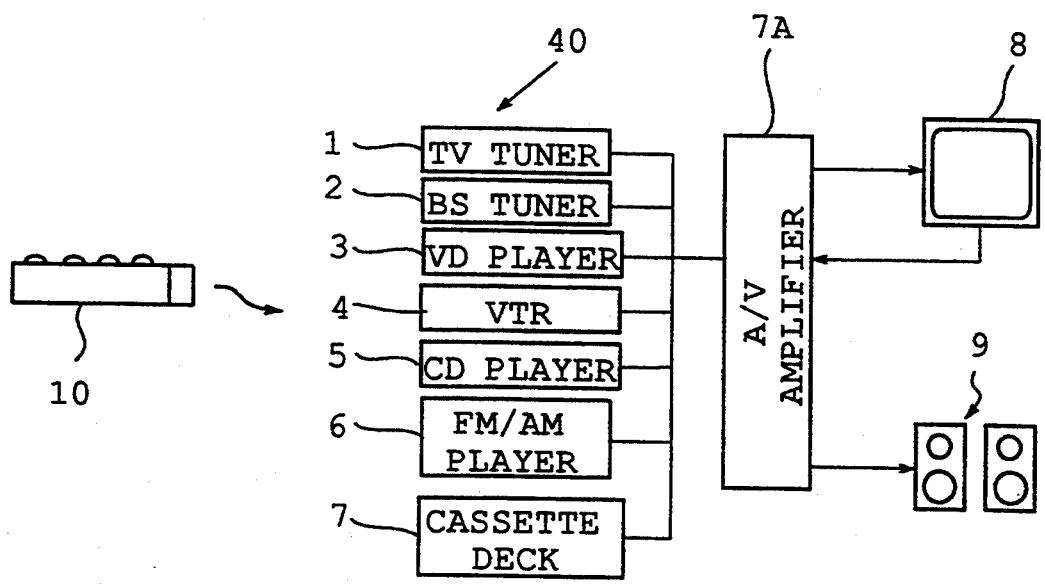
FIG. 5 is a block diagram of an audio/video system and a conventional remote control.
Figure 6:
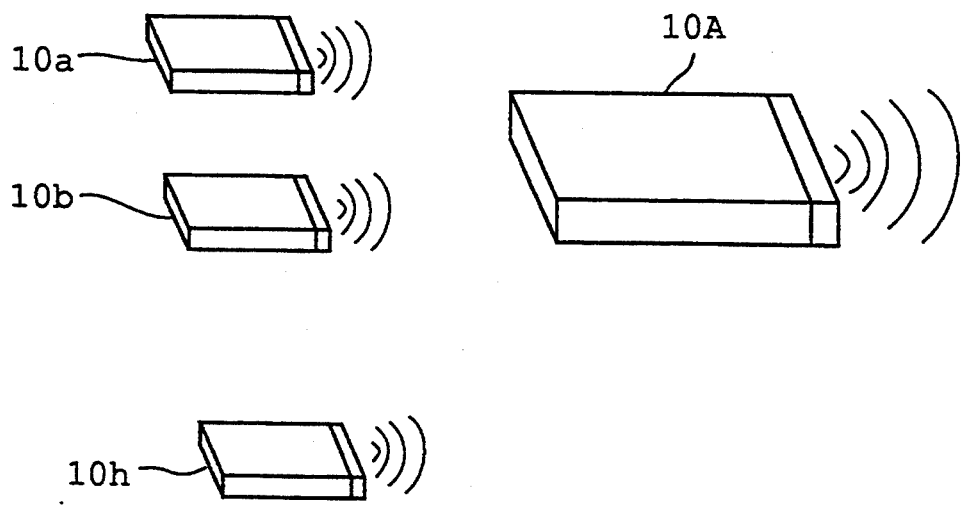
FIG. 6 is a schematic diagram describing a conventional programmable remote control.

Referring to FIG. 4, showing an A/V system to which the second embodiment of the present invention is applied, an obstructive P is set between the A/V system control unit 30 and the A/V devices 40, thereby obstructing the infrared ray transmitted from the light emitting section 34 of the control unit 30 to a light receiving section in each A/V device 40. In order that the A/V devices 40 may be controlled by the remote controller, an independent light emitting section 34a which is connected to the control unit 30 through a lead R is disposed between the obstructive P and the A/V devices 40. Thus, a multi-room remote control system can be obtained.

From the foregoing it will be understood that the present invention provides a remote control system for an A/V system, where the A/V system is controlled with only one manual operation of a remote controller, so that the operability is improved and the handling of the remote controller is simplified.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A remote control system for an audio/video system including a plurality of audio/video (A/V) devices, comprising:
    a) first remote control signal emitting means having a plurality of switches for emitting a plurality of first remote control signals, each of which is provided for designating and for operating one of the A/V devices; and
    b) an A/V system control unit for controlling said plurality of A/V devices including
        1) receiving means for receiving each of the first remote control signals,
        2) code determining means, responsive to a first remote control signal received by said receiving means, for determining a designation code for each of said A/V devices designated by said first remote control signal,
        3) operational mode setting means, having means for storing a plurality of sequential operation signals and being responsive to said designation code, said operational mode setting means for setting a sequential operation signal which sequentially operates each designated A/V device and any A/V devices associated therewith, and
        4) second remote control signal emitting means for emitting a second remote control signal dependent on the set sequential operation signal which sequentially operates the designated A/V device and any A/V devices associated therewith in accordance with the set operation signal.

2. A system according to claim 1 wherein the operational mode setting means has means for deriving one of the operational modes in accordance with the received first remote control signal.

3. A system according to claim 1 wherein each of the first remote control signal emitting means and the second remote control signal emitting means is a remote controller for emitting the signal by means of light.

4. A system according to claim 1 wherein the A/V system control unit has means for emitting a received first remote control signal without modifying the received first remote control signal.

5. A system according to claim 1 wherein the A/V system control unit has an independent light emitting means connected thereto through a transmission means.

* * * * *